United States Patent
Skurkis et al.

(10) Patent No.: US 11,945,082 B2
(45) Date of Patent: Apr. 2, 2024

(54) COMPLEX LOCATING FIXTURE SYSTEM AND METHOD

(71) Applicant: GM GLOBAL TECHNOLOGY OPERATIONS LLC, Detroit, MI (US)

(72) Inventors: Richard J. Skurkis, Lake Orion, MI (US); Tyson W. Brown, Royal Oak, MI (US); Mark A. Smith, Huntington Woods, MI (US); Miguel A. Saez, Clarkston, MI (US); John P. Spicer, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 644 days.

(21) Appl. No.: 17/098,854

(22) Filed: Nov. 16, 2020

(65) Prior Publication Data

US 2022/0152785 A1    May 19, 2022

(51) Int. Cl.
*B25B 11/00* (2006.01)
*B25B 5/14* (2006.01)

(52) U.S. Cl.
CPC ............ *B25B 5/14* (2013.01); *B25B 11/00* (2013.01)

(58) Field of Classification Search
CPC .......... B25B 11/00; B25B 11/02; B23Q 3/10; B23Q 3/102; Y10T 29/49895; Y10T 29/53913; F16B 2200/40; F16B 2200/83
USPC ................ 29/281.5, 243.519; 269/289 R
See application file for complete search history.

(56) References Cited

U.S. PATENT DOCUMENTS

| | | | |
|---|---|---|---|
| 9,061,403 B2 | 6/2015 | Colombo et al. |
| 9,067,379 B2 | 6/2015 | Morris |
| 9,067,625 B2 | 6/2015 | Morris et al. |
| 9,156,506 B2 | 10/2015 | Colombo et al. |
| 9,216,704 B2 | 12/2015 | Morris et al. |
| 9,238,488 B2 | 1/2016 | Kiester et al. |
| 9,243,655 B2 | 1/2016 | Morris et al. |
| 9,278,642 B2 | 3/2016 | Colombo et al. |
| 9,297,400 B2 | 3/2016 | Morris et al. |
| 9,303,667 B2 | 4/2016 | Morris et al. |
| 9,382,935 B2 | 7/2016 | Morris et al. |
| 9,388,838 B2 | 7/2016 | Morris et al. |
| 9,428,046 B2 | 8/2016 | Morris et al. |
| 9,428,123 B2 | 8/2016 | Morris et al. |
| 9,429,176 B2 | 8/2016 | Morris et al. |
| 9,446,722 B2 | 9/2016 | Morris et al. |
| 9,447,806 B2 | 9/2016 | Morris et al. |

(Continued)

FOREIGN PATENT DOCUMENTS

| | | |
|---|---|---|
| CN | 104776094 A | 7/2015 |
| CN | 104864008 A | 8/2015 |
| CN | 111496462 A | 8/2020 |

*Primary Examiner* — Lee D Wilson
*Assistant Examiner* — Alberto Saenz
(74) *Attorney, Agent, or Firm* — Lorenz & Kopf, LLP

(57) ABSTRACT

Systems and methods are provided for locating a pair of components relative to one another using complex surfaces. One component has a complex surface, where the complex surface is smoothly contoured. Another component is shaped to be connected with the first component. A fixture locates the first component relative to the second component. The fixture includes a locator with a complex surface region shaped to mate with the complex surface of the one component to locate the fixture relative to that component. The fixture includes another locator to locate the fixture relative to the second component.

20 Claims, 6 Drawing Sheets

(56) References Cited

U.S. PATENT DOCUMENTS

| | | |
|---|---|---|
| 9,447,840 B2 | 9/2016 | Morris et al. |
| 9,457,845 B2 | 10/2016 | Morris et al. |
| 9,458,876 B2 | 10/2016 | Morris et al. |
| 9,463,538 B2 | 10/2016 | Morris |
| 9,463,829 B2 | 10/2016 | Colombo et al. |
| 9,463,831 B2 | 10/2016 | Morris et al. |
| 9,481,317 B2 | 11/2016 | Morris et al. |
| 9,488,205 B2 | 11/2016 | Morris et al. |
| 9,511,802 B2 | 12/2016 | Morris et al. |
| 9,541,113 B2 * | 1/2017 | Morris .................. F16B 19/02 |
| 9,556,890 B2 | 1/2017 | Colombo et al. |
| 9,599,279 B2 | 3/2017 | Morris et al. |
| 9,618,026 B2 | 4/2017 | Morris et al. |
| 9,657,807 B2 | 5/2017 | Morris et al. |
| 9,669,774 B2 | 6/2017 | Smyth et al. |
| 9,812,684 B2 | 11/2017 | Smith et al. |
| 9,863,454 B2 | 1/2018 | Morris et al. |
| 9,935,412 B1 | 4/2018 | Smith et al. |
| 10,343,737 B1 * | 7/2019 | Pascoe .................. B62D 65/06 |
| 10,363,891 B2 | 7/2019 | Zaldivar Ortiz et al. |
| 2013/0106042 A1 * | 5/2013 | Gao .................. B62D 65/026 |
| | | 269/289 R |
| 2014/0008853 A1 * | 1/2014 | Innocente .............. B23Q 3/154 |
| | | 269/8 |
| 2014/0041176 A1 | 2/2014 | Morris |
| 2015/0035632 A1 * | 2/2015 | Sarh .................. B25B 11/002 |
| | | 335/290 |
| 2018/0057188 A1 * | 3/2018 | Deck .................. F16M 11/42 |

* cited by examiner

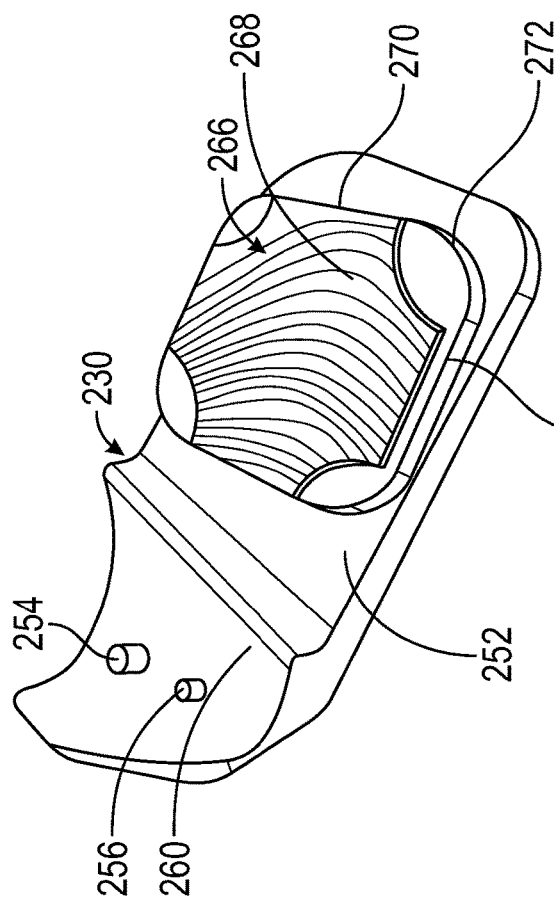
FIG. 4
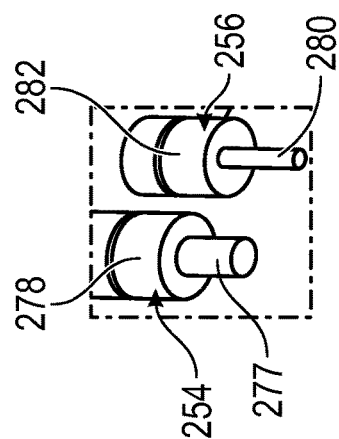
FIG. 6
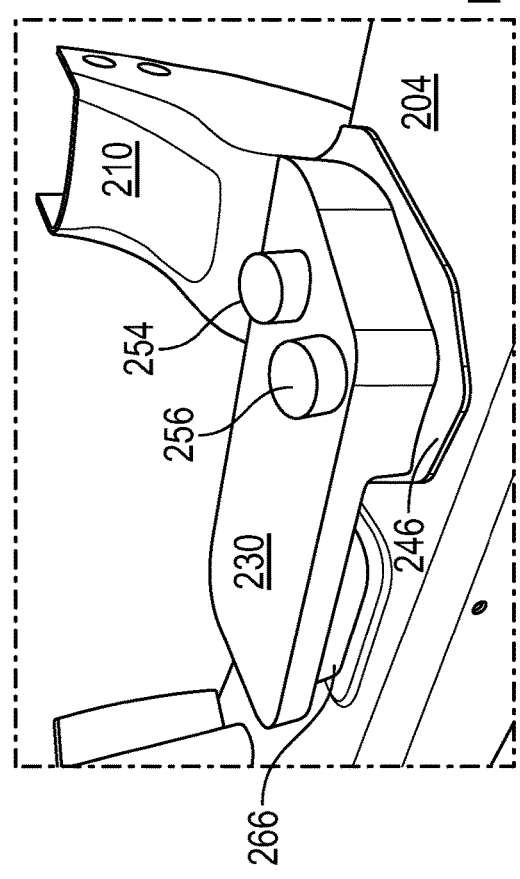
FIG. 3
FIG. 5

COMPLEX LOCATING FIXTURE SYSTEM AND METHOD

INTRODUCTION

The present disclosure generally relates to manufacturing and service fixture tooling with complex locating features, and more particularly relates to additive manufactured fixtures for locating and fixturing of parts in joining processes, utilizing component math data, additive manufacturing (3D printing), elastic averaging, and other features.

Part locating for assembly and service operations requires accurate and repeatable alignment before joining of the components for quality function and/or appearance purposes. One component has six degrees of freedom including linear translations in the x, y and z axes, as well as rotational motion around each of the x, y and z axes. Locating two components for assembly together often involves constraining the components relative to a datum to eliminate twelve degrees of freedom for the two components. The various components to be joined may each be aligned relative to a fixed datum point to remove the various degrees of freedom between the components prior to fixing the components together. To accomplish constraint, dedicated locating features may be produced by additive or subtractive means, or otherwise added to the different components solely for locating purposes. To account for the component part tolerance variations between the dedicated locating features, a certain amount of clearance must be designed into the locating features, which decreases the precision of the alignment.

Additive manufacturing or 3D printing technologies have come into widespread use due to their desirable qualities such as efficiency and flexibility. Various types of 3D printing technologies have been developed for creating objects from metal and polymer materials. The various 3D printing technologies each generally includes a build surface, a material delivery system, an energy delivery system, and a control system. The build surface provides a reference surface upon which the material is deposited, layer-by-layer to successively build up the part according to design details. The material delivery system effects the depositing of a feedstock material, such as in a particle, fiber or filament form, for fusing with the previously deposited layer. The energy delivery system adds energy to the feedstock material before, during and/or after deposition for liquifying/fusing the material into the part being created. The control system operates each of the other systems in building the object being created, such as according to math data definition.

While additive manufacturing is expanding in use, producing manufacturing and service tooling still generally requires long lead times and high costs. In applications, such as when tooling is needed for low volume production runs, development phases, or in-field service/repair purposes, the timing and costs may be impediments to tool creation. Creating tooling and fixtures more efficiently and quickly would provide benefits.

Accordingly, it is desirable to produce fixture tooling quickly and efficiently, while maintaining a high level of locating accuracy. In addition, it is desirable to provide features that facilitate locating and fixturing component parts for joining, including for additive manufactured parts that desirably include complex features. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for locating a pair of components relative to one another using complex features. In a number of embodiments, a locating fixture system includes a component that has a complex surface that is smoothly contoured. Another component is shaped to connect with the component that has the complex surface. A fixture locates the two components relative to each other. The fixture also includes a locator with a complex surface region shaped to mate with the complex surface to locate the fixture relative to the component that has the complex surface. The fixture includes another locator that locates the fixture relative to the other component.

In additional embodiments, the fixture is made of an additive manufactured built-up material with compliance tailored printed features that provide relatively lower compliance in at least one direction to target critical locating dimensions and relatively higher compliance in at least one other direction.

In additional embodiments, the fixture embodies portability by being made of a polymeric material and by being uniquely configured for locating the first component and the second component relative to one another.

In additional embodiments, the complex surface comprises at least one complex algebraic surface.

In additional embodiments, a pin extends through the fixture and into the component at the complex surface.

In additional embodiments, at least one of the locators embodies an elastically deformable structure and provides an elastic averaging effect in locating the fixture relative to at least one of the components.

In additional embodiments, the fixture includes a third locator and an adjustment mechanism on the fixture that engages at least one locator to adjust its position.

In additional embodiments, the fixture has an integrated magnet that holds the fixture to at least one of the components.

In additional embodiments, the fixture has an integrated sensor that monitors at least one parameter of the system.

In additional embodiments, the fixture includes a magnet that holds the fixture to at least one component and the parameter comprises an electro-motive force generated by the magnet.

In a number of additional embodiments, a locating method includes forming a first component with a complex surface, where the complex surface is smoothly contoured. A second component is formed with a shape for connection with the first component. A fixture includes a first locator formed with a complex surface region shaped to mate with the complex surface of the first component. The fixture to include a second locator formed to locate the fixture relative to the second component. The first component is located relative to the second component by the fixture and the first component is connected with the second component.

In additional embodiments, the fixture is formed by additive manufacturing of built-up layers from multiple materials where different the multiple materials exhibit different stiffness to controls compliance in different directions.

In additional embodiments, the fixture is formed of a polymeric material and is tailored as a unique fixture designed solely to locate two specific components relative to each other. In addition, the fixture is tailored for portability for use in field service and repairs.

In additional embodiments, the complex surface is formed as at least one complex algebraic surface.

In additional embodiments, a pin extends through the fixture and into the first component at the complex surface to constrain the first component.

In additional embodiments, the first locator is formed as an elastically deformable structure. The first locator provides an elastic averaging effect in locating the fixture relative to the first component.

In additional embodiments, a screw extends through the fixture and engages at least one locator. The screw adjusts a position of the engaged locator.

In additional embodiments, a magnet is integrated into the fixture. The magnet holds the fixture to at least one component.

In additional embodiments, a sensor is integrated into the fixture. The sensor monitors at least one parameter of the system.

In a number of additional embodiments, a locating fixture system includes a first component having a complex surface that is smoothly contoured. A second component is shaped to be connected with the first component. A fixture is made of an additive manufactured built-up material and locates the components relative to each other. The fixture includes a first locator with a complex surface region shaped to mate with the complex surface of the first component to locate the fixture relative to the first component. The first locator is made of an elastically deformable structure and is configured to provide an elastic averaging effect in locating the fixture relative to the first component. The fixture includes a second locator configured to locate the fixture relative to the second component.

BRIEF DESCRIPTION OF THE DRAWINGS

The exemplary embodiments will hereinafter be described in conjunction with the following drawing figures, wherein like numerals denote like elements, and wherein:

FIG. 3 is a detail illustration of a portion of the assembly of FIG. 2 in preparation for joining two of the components, in accordance with various embodiments;

FIG. 4 is a perspective view illustration of a fixture for position locating of the two components of FIG. 3, in accordance with various embodiments;

FIG. 5 is a perspective view illustration of the fixture of FIG. 4 applied to locate the two components of FIG. 3, in accordance with various embodiments;

FIG. 6 is a detail, perspective illustration of removeable locating pins of the fixture of FIG. 4, in accordance with various embodiments;

DETAILED DESCRIPTION

Figure 1:
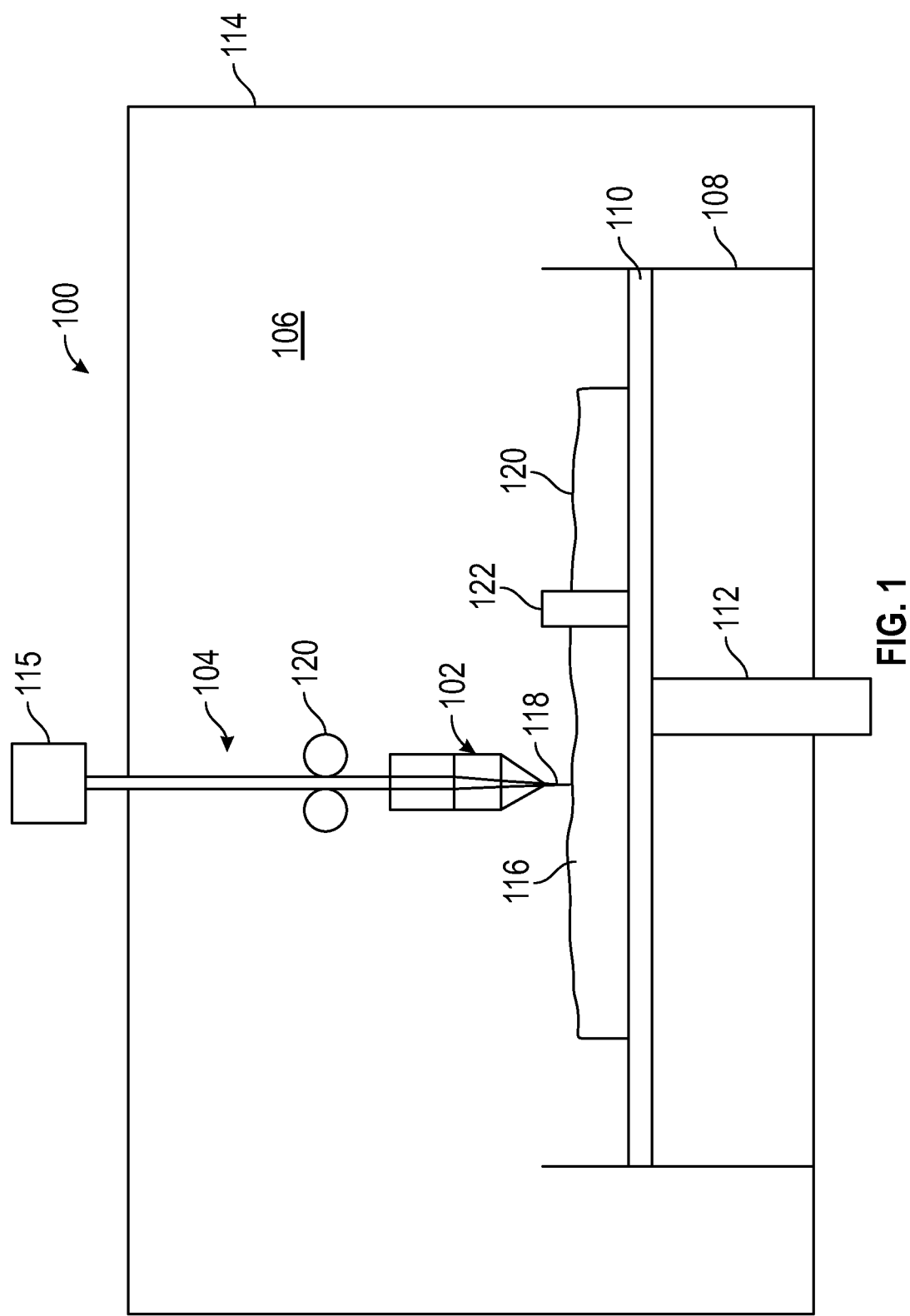
FIG. 1 is a schematic diagram of an additive manufacturing system in the process of building a fixture, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, products and methods are disclosed for locating plural components to be joined together. In a number of embodiments, complex locating features are included in fixtures to locate components relative to one another using features of the components themselves, without referencing a fixed datum point such as in an x, y, z coordinate system. The complex locating features (locators), may include any of elastically deformable features, contoured/complex surfaces, flat surfaces, magnets, pins, holes, adjustable features, and others. The complex locating features may be combined to constrain each component in its six degrees of freedom and may be used to overconstrain the components. This approach creates a system and method to precisely locate the components relative to one another without referencing a common datum point and enables creating a simple portable fixture that may be efficiently and economically produced without the need for large, heavy costly assembly cells. In addition to, or separately from forming a locating surface, magnets may hold (clamp) surfaces together so they do not move during assembly. In a number of embodiments, sensors may be incorporated for monitoring and to improve joining quality. In a number of embodiments, the fixtures may be efficiently and quickly produced using additive manufacturing techniques. Component fixtures may be produced in a fraction of the time and cost of a traditional dedicated tooling fixtures, making the approach beneficial for low volume builds, in-field service, and preproduction development activities. In addition, locating using complex features enables accurate component positioning while avoiding a need to engineer in dedicated location datums of the components. Overconstraining the components using elastic averaging features provides more precise positioning than is otherwise possible, and additive manufacturing enables embedding magnets, sensors and other features.

With regard to avoiding a requirement for referencing a common datum point, as disclosed herein components are located in an assembly using multiple independent localized datum features for each different component as it is added to the assembly. This is in contrast to an approach of locating each component to the assembly with respect to a single common datum reference for the entire assembly. The common datum reference approach would require a single large complex fixture that holds all components with respect to a single common fixture datum at the same time. The approach disclosed herein reduces complexity by having multiple smaller independent component fixtures where each is responsible for locating a single component to the assembly at a localized datum position.

Referring to FIG. 1, an additive manufacturing cell 100 is schematically illustrated. In general, the additive manufacturing cell 100, which may also be referred to as a 3D printing system, includes an energy delivery system in the form of heat source 102, which may be of the any heat producing type, a material deposition system in the form of a material depositor 104, a build chamber 106 defined by a build box 108, and a build platform 110 with an elevator 112. In a number of embodiments, a gas delivery system (not shown), may be included for delivery of an inert gas to an outer chamber 114 to provide a favorable environment for the build. In the current embodiment the additive manufacturing cell 100 is illustrated as a fused deposition modelling type additive manufacturing/3D printing system. In other embodiments other additive manufacturing approaches may be used such as stereolithography, digital light processing, selective laser sintering, selective laser melting. laminated object manufacturing, digital beam melting, or others. It will be appreciated that the fixture 116 being printed may comprise a polymer material, a metal material, and/or a combination of different types of materials, depending on the design and durability requirements of the fixture 116. Accordingly, the 3D printing approach selected may be tailored to the materials selected for forming the fixture 116.

In the current embodiment, the additive manufacturing cell 100 is configured for the application of a filament material 118 from a container 115 to build the fixture 116 through delivery by the material depositor 104, and melting/fusing of the material 118 by the heat source 102 via a controlled exposure. The material 118 is applied by rollers 120 of the material depositor 104 in a series of successive layers onto the build platform 110. The fixture 116 is successively built up in layers on the build platform 110. In other embodiments, other mechanisms may be used to distribute the material 118 such as a roller, brush, blade, spreader, sprayer, or others.

Energy for fusing the powder particles is provided by the heat source 102. The material 118 is heated to above its melting point to enable fusion with the previously deposited layer. In other embodiments, another form of energy source may be employed.

The build platform 110 defines the bottom of the build box 108 and is mounted with the elevator 112 for lowering during the build and for raising following the build or in preparation for the build. In other embodiments, rather than using the elevator 112, the build platform may remain at a static height and the material depositor 104 may change elevation. The fixture 116 is built up as the layers are deposited. Different materials may be deposited to form different features of the fixture 116, and preformed features 122 (such as magnets, sensors, pins, etc.) may be added mechanically before or during printing. When the formation process for a given layer is completed, the build platform 110 may be lowered by the amount of the layer thickness and the next material layer is applied. This process is repeated until the entire design geometry of the fixture 116 is generated.

Figure 2:
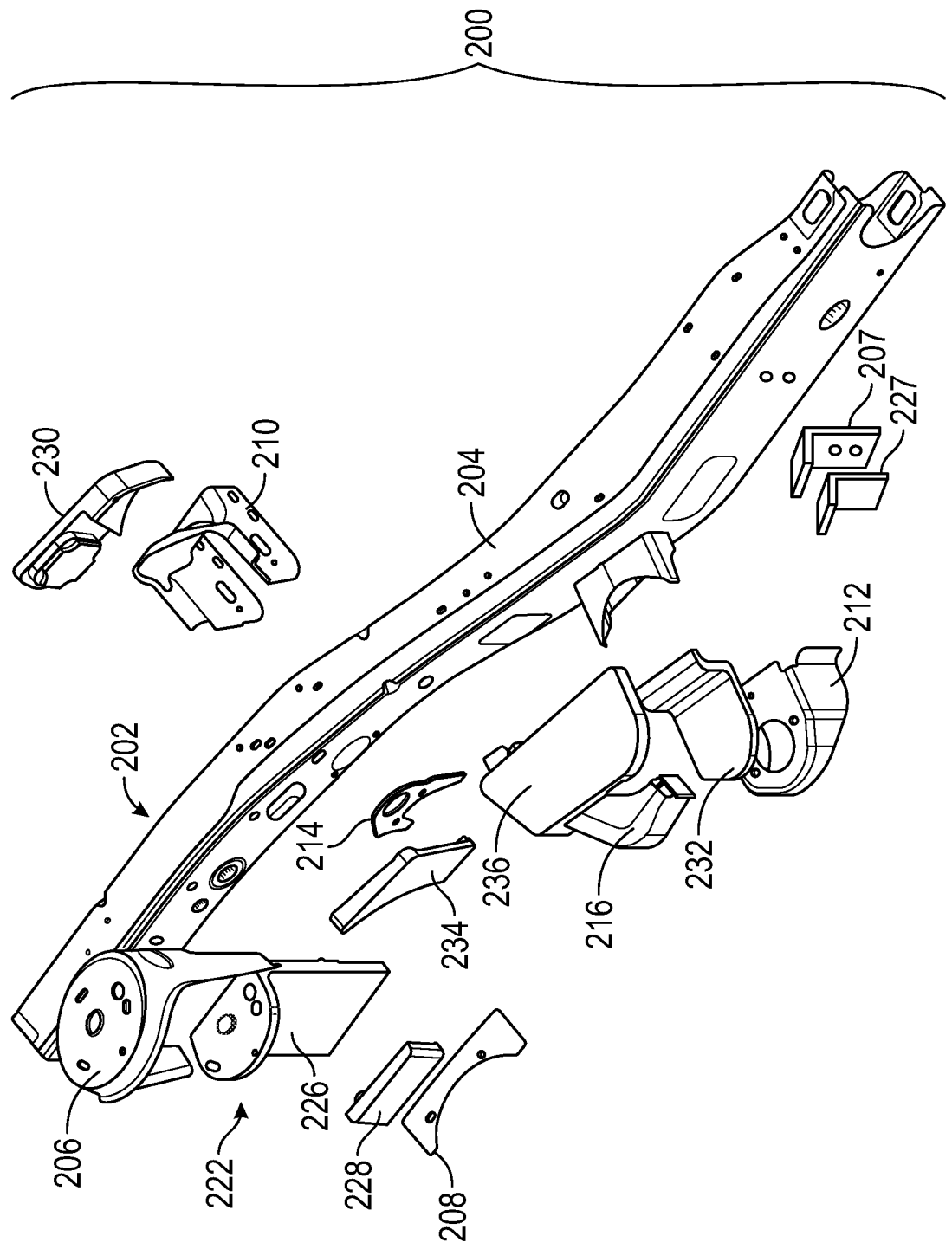
FIG. 2 is a perspective, exploded view illustration of an assembly with multiple components and associated assembly fixtures, in accordance with various embodiments.

Referring to FIG. 2, an assembly application in the form of a frame assembly and fixture set 200 is illustrated. The frame assembly 202 includes a frame rail 204, a shock tower 206, a bracket 207, a stabilizer 208, a brace 210, a bracket 212, a hanger 214, and a support 216. Each of the shock tower 206, the bracket 207, the stabilizer 208, the brace 210, the bracket 212, the hanger 214, and the support 216 components require locating relative to the frame rail 204 and/or to one another prior to being fixed together in the frame assembly 202. The fixture set 222 includes a fixture 226 that locates the shock tower 206 relative to the frame rail 204, a fixture 227 that locates the bracket 207 relative to the frame rail 204, a fixture 228 that locates the stabilizer 208 relative to the shock tower 206 and the frame rail 204, a fixture 230 that locates the brace 210 relative to the frame rail 204, a fixture 232 that locates the bracket 212 relative to the frame rail 204, a fixture 234 that locates the hanger 214 relative to the frame rail 204 and a fixture 236 that locates the support 216 relative to the frame rail 204 and the bracket 212. Rather than referencing a single fixed datum point, each of the fixtures 226, 227, 228, 230, 232, 234 and 236 uses complex locating features to locate/position the respective components relative to one another for assembly, which in the current embodiment is effected by joining such as by welding and/or fastening. In the current embodiment, the fixtures 226, 227, 228, 230, 232, 234 and 236 are manufactured using 3D printing and are fabricated from various materials generally including a polymer. In other embodiments, any other material, or combination of materials, may be used to form the fixture set 222.

In FIG. 3, the brace 210 is shown positioned on the frame rail 204 at or near its assembly location. The brace 210 is located near an opening 240 in the frame rail 204 that includes a rim 242 that projects outward from the surface 244 of the frame rail 204. The rim 242 forms a complex surface 238 (inside surface of the rim 242). The brace 210 includes a complex surface 246, an elliptical shaped hole 248 and a round hole 250. The elliptical shaped hole 248 and a round hole 250 may be formed through the brace 210 at the complex surface 246. The opening 240, the complex surface 246, the elliptical shaped hole 248 and the round hole 250 each are features of the components that are not added for locating purposes, but each presents as a candidate for use in constraining the brace 210 relative to the frame rail 204 for locating purposes prior to joining. The complex surfaces 238, 246 are complex in-that they are defined according to functional, formability, packaging, and/or aesthetic requirements of the components and generally have curved and/or smoothly contoured surfaces. The complex surfaces 238, 246 may each be a complex algebraic surface or a set of complex algebraic surfaces, such as where each surface in the set is a smooth projective variety of dimensions in a three-dimensional space.

FIG. 4 illustrates the fixture 230, which includes complex locating features that use the aforementioned candidates, to locate the brace 210 relative to the frame rail 204. The fixture 230 includes a body 252 formed of a polymer, such as acrylonitrile-butadiene-styrene copolymer (ABS), by 3D printing, such as in the additive manufacturing cell 100. The fixture 230 includes a pair of pins 254, 256, which in the current embodiment are formed of metal, such as steel, by machining. In other embodiments, the pins 254, 256 may be formed of other material and may be formed by additive manufacturing along with the body 252 in the additive manufacturing cell 100.

The fixture 230 includes complex locating features (complex locators), including two complex surface regions 260, 262, and the two pins 254, 256. The complex surface regions 260, 262 are complex in-that they are designed to mate with complex formed surfaces of the frame rail 204 and the brace 210 (as defined above). The set of complex locators overconstrain the brace 210 relative to the frame rail 204. Overconstraining with mating compliant contact surfaces delivers high precision in positioning the brace 210 relative to the frame rail 204. The complex surface region 260 is shaped as a dished out area that matches the profile of and locates on the stamped, complex surface 246 (FIG. 3) of the brace 210. The complex surface region 260 may be generated using the 3D math data for the brace 210 in printing of the fixture 230. The complex surface region 262 is shaped as the perimeter of a plug 266 that fits within the opening 240 and that locates against the inside/complex surface 238 of the rim 242. The complex surface region 262 may be generated using the 3D math data for the frame rail 204 in printing of the fixture 230. Each of the complex surface regions 260, 262 locates off complex/contoured features and each provides an elastic averaging effect where the elasticity of the locating features provides compliance that facilitates settling of the fixture 230 into an average position to accurately locate the brace 210 relative to the frame rail 204. The brace 210 is located relative to the frame rail 204 without the need for locating relative to a fixed datum, and without dedicated added in locating features that are otherwise not needed for the function of the components. In the case of the plug 266, a cross-shaped projection 268 provides relatively more elasticity at the four corners 272 and relatively less elasticity at the four edges 270. This accommodates more variation in the corners 274 of the rim 242 and more heavily uses the edges 276 of the rim 242 for accurate locating.

The fixture 230 includes the pins 254, 256 to take advantage of the holes 248, 250 that are included in the design of the brace 210 for purposes other than locating. The pins 254, 256 constrain the fixture 230 in the additional degrees of freedom that are needed because of the shape of the stamped, complex surface 246, which if not further constrained, would allow the fixture 230 to move relative to the brace 210. One pin provides constraint so that all twelve degrees of freedom between the frame rail 204 and the brace 210 are constrained. The second pin overconstrains and provides an elastic averaging effect where the elasticity of the two pins 254, 256 in the two holes 248, 250 provides an averaging of the position of the fixture 230 relative to the brace 210 for improved accuracy in locating.

As shown in FIG. 5, the plug 266 nests within the complex formed surface of the opening 240 and provides an elastic averaging effect between the complex surface region 262 and the complex surface 238 of the rim 242, thereby locating the fixture 230 relative to the frame rail 204. The formed, complex surface 246 of the brace 210 nests within the body 252 of the fixture 230 at the complex surface region 260 and the complex surface region 260 provides elastic averaging effect between the complex surface region 260 and the complex surface 246. The pins 254, 256 may be inserted after the body 252 is positioned relative to the brace 210 and relative to the frame rail 204. With the brace 210 located relative to the frame rail by the fixture 230, the two may be joined together, such as by welding, with the components constrained in their design orientation and location.

FIG. 6 illustrates that the pins 254, 256 may be removed from the body 252 once the brace 210 is connected/welded to the frame rail 204. The pin 254 includes a shaft 277 that is sized to fit within the hole 248 and includes a segment 278 that is larger and that provides a stop feature when inserted into the body 252 and that provides a feature that may be manually or robotically gripped for insertion and removal. The pin 256 includes a shaft 280 that is sized to fit within the hole 250 and includes a segment 282 that is larger and that provides a stop feature when inserted into the body 252 and that provides a feature that may be manually or robotically gripped for insertion and removal. Because the brace 210 is overconstrained relative to the frame rail 204 by the fixture 230, removal of the pins enables removing the body 252 once the brace 210 is fixed to the frame rail 204. The fixture 230 provides an economically produced and light-weight locator for assembly of the brace 210 to the frame rail 204 that may be produced by 3D printing and that is readily portable and may be used during product development, in an original manufacturing environment, and in the field for reworking/repairs.

Figure 7:
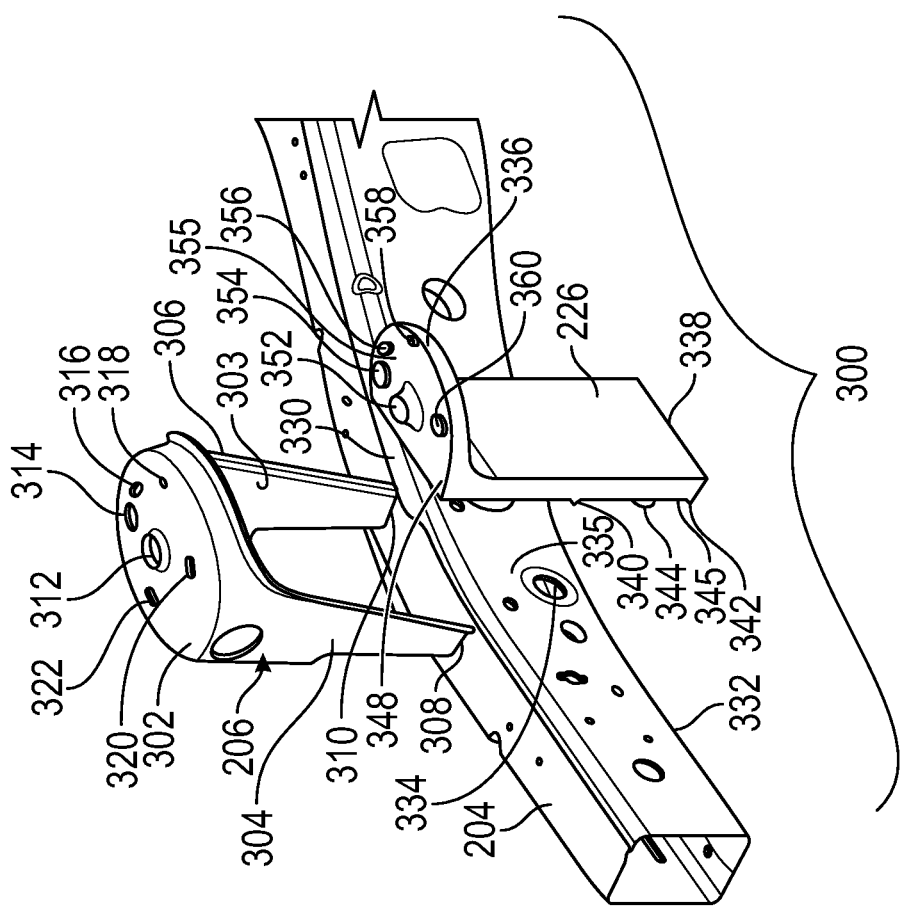
FIG. 7 is an exploded, perspective view illustration of two components of the assembly of FIG. 2 and a fixture for position locating the components, in accordance with various embodiments.

Referring to FIG. 7, a shock tower assembly system 300 includes the frame rail 204, the shock tower 206 and the fixture 226. The shock tower 206 includes a platform 302 and a pair of risers 304, 306 with respective ends 308, 310 configured for joining with the frame rail 204, such as by welding. The platform 302 of the shock tower 206 includes a center opening 312 and five openings 314, 316, 318, 329 and 322 distributed around the center opening 312. The shock tower 206 includes a complex surface 303, including under the platform 302. The frame rail 204 includes a number of features including a top edge 330, a bottom edge 332, a hole 334, and a complex surface 335. The fixture 226 is generally L-shapes and includes a leg 336 adapted to mate with the platform 302 and includes a complex surface region 355 matching the shape of the complex surface 303. The fixture 226 includes a leg 338 adapted to mate with the frame rail 204 and includes a complex surface region 345 matching the shape of the complex surface 335. The leg 338 includes various locator features including the complex surface region 345 configured to locate on the complex surface 335, a ridge 340 configured to locate on the top edge 330, a ridge 342 configured to locate on the bottom edge 332 and a plug 344 configured to locate in the hole 334. The locators interface with the frame rail 204 and may include elastic averaging features which flex to find an average position in locating the fixture 226 relative to the frame rail 204.

The leg 336 of the fixture 226 includes five locators on its top surface 348 for locating the fixture 226 relative to the shock tower 206. The five locators include a center locator 352 that engages in the opening 312 and centers the fixture 226 relative to the platform 302 of the shock tower 206. The complex surface region 355 is configured to locate on the complex surface 303. The rotational position of the fixture 226 relative to the shock tower 206 is set by the locators 354, 356, 358 and 360, which engage in the openings 314, 316, 318, 320, respectively. The various locators provide an elastic averaging effect where their compliance effects finding an average position among the several mating features. In the current embodiment, centering the fixture 226 relative to the platform 302 of the shock tower 206 is more critical than rotational position and so the center locator 352 is printed from a material that has less compliance than the material from which the locators 354, 356, 358 and 360 are printed. For example, the center locator 352 may be printed from ABS material with a hardness that is greater than the hardness of the ABS material used to print the locators 354, 356, 358 and 360 and therefore has less compliance. Using the center locator 352 along with the locators 354, 356, 358 and 360 and the complex surface region 345/complex surface 335 interface, overconstrains the fixture 226 relative to the shock tower 206.

Figure 8:
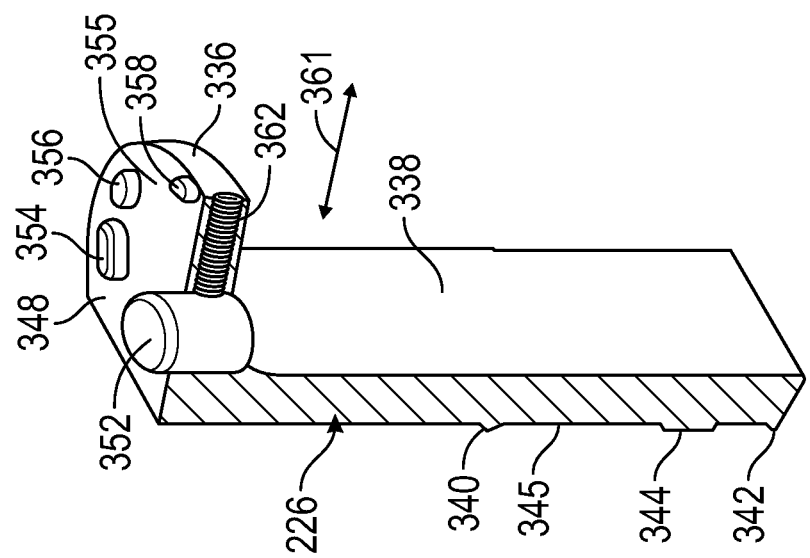
FIG. 8 is a cross sectional illustration of the fixture of FIG. 7, in accordance with various embodiments.

As shown in FIG. 8, the center locator 352 is adjustable in the direction 361 due to the inclusion of an adjusting screw 362 that extends through the leg 336 and engages the center locator 352. For example, the center locator 352 may be adjusted to account for tolerance variation in the build of the shock tower 206 so that the component is accurately located prior to welding. In other embodiments, the center locator 352 may be adjusted to provide positional tuning of a critical locating feature to adjust the location of the shock tower 206 relative to the frame rail 204 to optimize the assembly. In a number of embodiments, the screw 362 is printed into the fixture 226 during the additive manufacture process. In other embodiments, the screw 362 is a separate part added to the fixture 226 after printing. In additional embodiments, the screw 362 is replaced or supplemented by other adjustment mechanics such as a linear slide, a rack and pinion, gearing, or others.

Figure 9:
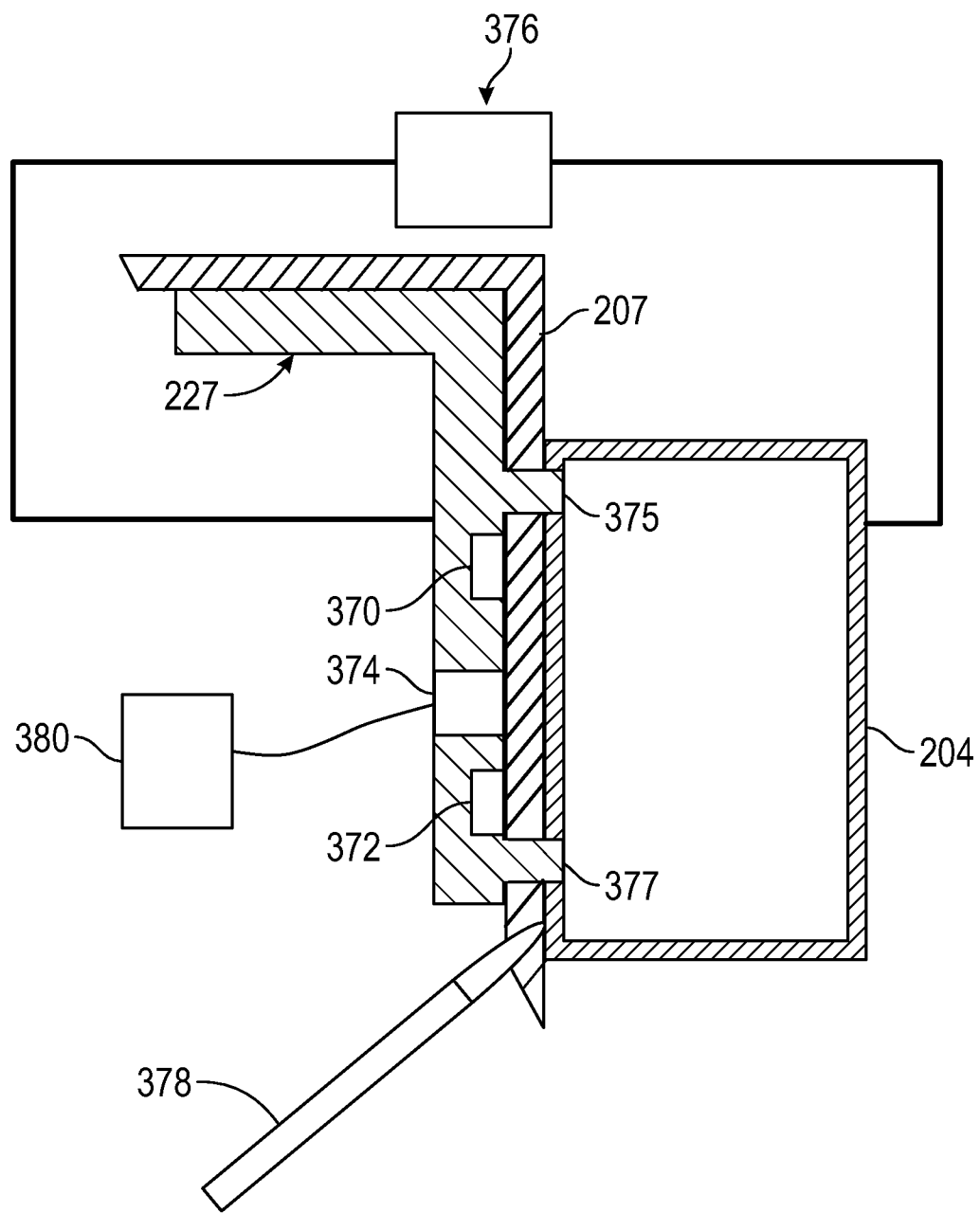
FIG. 9 is a schematic, sectional illustration of a fixture locating two components of the assembly of FIG. 2, in accordance with various embodiments.

Referring to FIG. 9, a schematic illustration of the fixture 227 of FIG. 2 shows the inclusion of integrated features including magnets 370, 372 and a sensor suite 374. The fixture 227 may be printed, such as in the additive manufacturing cell 100, with the magnets 370, 372 and the sensor suite 374 incorporated/integrated. The fixture 227 locates the bracket 207 relative to the frame rail 204 using the complex surface regions/complex surface interfaces and pins 375, 377 that extend through openings in the bracket 207 and the frame rail 204. The magnets 370, 372 hold the fixture 227 to the bracket 207 and obviate the need for a separate clamp to hold the two together. The magnetically coupled fixture 227 and the bracket 207 are clamped to the frame rail 204 by a clamp 376 that applies pressure to hold the bracket 207 in position while a welding tool 378 joins the bracket 207 to the frame rail 204. Including the magnets 370, 372, improves access for the welding tool 378, simplifies locating, and avoids interference with the clamp 376. Embedding the magnets 370, 372 may be accomplished in printed-in cavities with inserted magnets, or the magnets 370, 372 may be printed directly into the fixture 227 using 3D printing of magnetic composite materials (e.g. rare earth permanent magnet particles printed in polymeric binder material). The magnets 370, 372 may be permanent magnets, on/off switchable permanent magnets, or electromagnets. Switchable magnets and electromagnets enable the magnets 370, 372 to be engaged/disengaged to facilitate clamping and unclamping. The placement and strength of the magnets 370, 372 is selected to enable adequate clamping forces for desired component mating while not impacting the welding process.

The sensor suite 374 may be embedded in the printed fixture 227 and may be configured to monitor at least one parameter such as to determine position/location, electromotive force, temperature or other parameters. The sensor suite 374 is coupled with a controller 380, which receives signals from the sensor suite 374 for making determinations related to the manufacture or modification of the frame assembly 202. In general, the controller 380 uses the available inputs, including those from the sensor suite 374, to provide a control system to effectively govern various functions of the assembly of the product. The controller 380 generally includes a processor and a memory device, and may be coupled with a storage device. The processor performs the computation and control functions of the controller 380, and may comprise any type of processor or multiple processors.

In a number of embodiments, the sensor suite 374 includes a position sensor, such as a linear variable differential transformer linear-position sensor. Sensing relative position of the fixture 227, the bracket 207 and the frame rail 204 provides a clear indication of whether the components are aligned and provides improved quality of the joining process. The sensing function may be integrated with a robotically controlled assembly process to make on-the-fly adjustments.

In a number of additional embodiments, the sensor suite 374 includes an electro-motive force sensor/magnetometer to measure the magnetic force attracting the fixture 227 to the bracket 207 as generated by the magnets 370, 372. Sensing magnetic force provides an indication of alignment between the fixture 227 and the bracket 207 and may be used to improve positioning/quality of the assembly.

In a number of additional embodiments, the sensor suite 374 includes a temperature sensor, such as a thermocouple that produces a temperature dependent output. Providing temperature input to the controller 380 enables process control such as interrupting operation of the welding tool 378 when a temperature threshold is reached. The threshold may be set so that the maximum temperature exposure of the fixture 227 is not surpassed. The threshold may alternatively be set so that temperatures are not experienced that would effect/distort the position locating of the bracket 207 relative to the frame rail 204. When the threshold is reached, the welding process may be suspended allowing cooling before resuming operations, thereby improving quality of the assembly. In embodiments, the magnets 370, 372 and/or the sensor suite 374 are incorporated into any or all of the fixtures 226, 227, 228, 230, 232, and 234 of FIG. 2.

Figure 11:
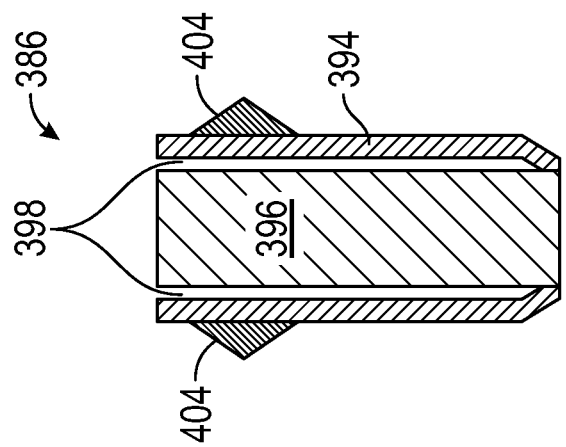
FIG. 11 is a detail illustration of part of the fixture of FIG. 10, in accordance with various embodiments.
Figure 10:
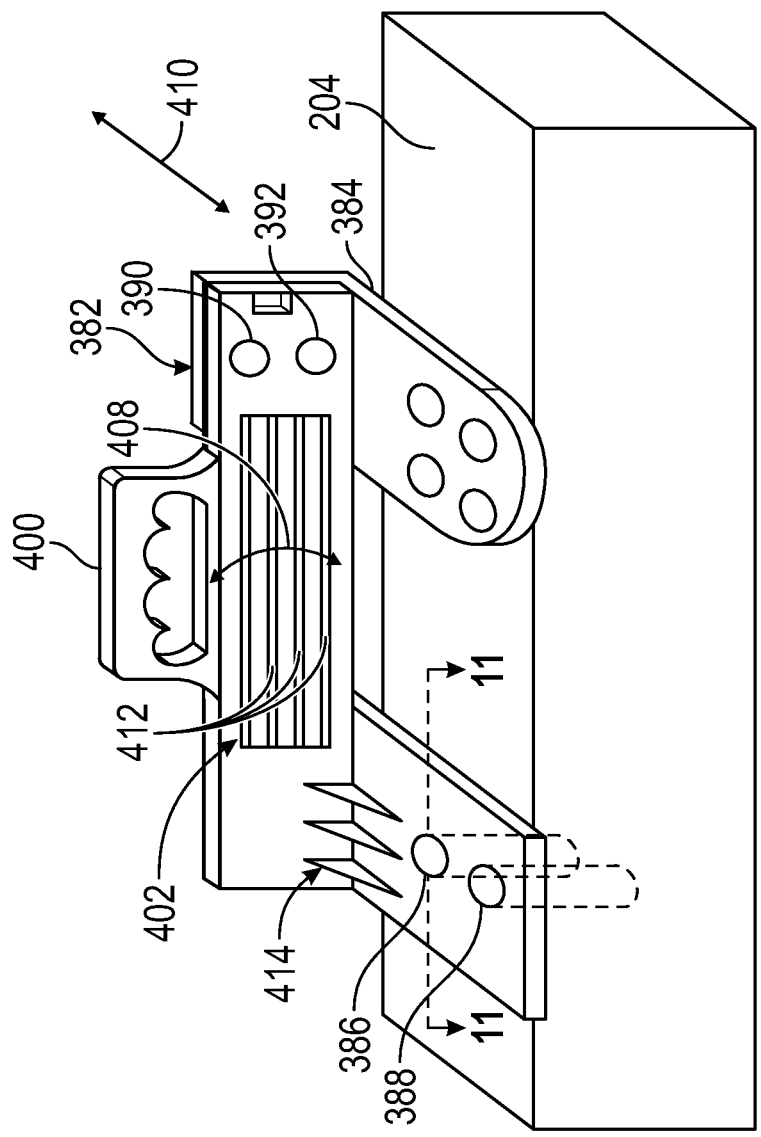
FIG. 10 is a perspective illustration of a fixture positioning components, such as of the assembly of FIG. 2, in accordance with various embodiments.

Referring to FIG. 10, a fixture 382 is illustrated for connecting a bracket 384 to the frame rail 204. The fixture 382 locates relative to the frame rail 204 via two locators 386, 388 and locates relative to the bracket 384 via locators 390, 392. In addition, complex surfaces/complex surface regions may be used. In general, the fixture 382 provides an elastic averaging effect through the locators 386, 388, includes an integrated handle 400 for ease of manual manipulation, and includes printed features 402 for compliance tailoring. In the current embodiment, the fixture 382 is printed from one common material. The elastic average effect may be provided by the locators 386, 388. The locator 386 is shown in cross section in FIG. 11 as a representative of both the locators 386, 388. The locator 386 is in the form of a compliant pin that locates within an opening in the frame rail 204 and includes a cylindrical body 394 with a hollow interior 396 and longitudinal slots 398. A pair of projections 404 extend outward from the cylindrical body 394. The hollow interior 396 and the longitudinal slots 398 increase compliance for the elastic averaging effect.

In the fixture 382, compliance tailoring printed features 402 provide greater compliance in the direction 408 and less compliance in the direction 410 to target the critical locating dimensions of the assembly. For example, locating of the bracket 384 on the frame rail 204 is more critical than the height of the bracket 384 relative to the frame rail 204. The compliance tailoring printed features 402 include slots 412 that allow greater compliance in the direction 408 and provide more rigidity in the direction 410. In addition, the compliance tailoring printed features 402 include ribs 414 that provide rigidity in the direction 410. In a number of embodiments, added compliance in a select direction may be included to accommodate known production variation. The fixture 382 may also include areas with varying compliance accomplished by printing with different materials, different shapes, and/or material properties (e.g. print elastomeric material near contact points). In other embodiments, contact surfaces may be harder for durability while the underlying material may be more compliant to enable elastic averaging. In other embodiments, contact surfaces may be electroplated with metal to increase durability. In embodiments, the additive manufactured built-up material may be multiple materials where different materials exhibit different stiffness which controls compliance of different directions.

Through the embodiments disclosed herein, complex surfaces are used as locating features for assembling components, enabling accurate part positioning with minimal engineered features for locating purposes. Overconstraining the components and/or elastic averaging delivers more precise component positioning, and additive manufacturing allows for unique features such as embedding magnets and/or sensors. The simplicity of the fixtures expands use to pre-production activities, field repair and servicing activities.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements and/or steps without departing from the scope of the disclosure as set forth in the appended claims and the legal equivalents thereof.

What is claimed is:

1. A locating fixture system comprising:
a first component having a first complex surface, wherein the first complex surface is smoothly contoured;
a second component having a second complex surface, the second component shaped to be connected with the first component; and
a fixture configured to locate the first component relative to the second component using the first complex surface of the first component and the second complex surface of the second component, wherein the fixture includes a first locator comprising a complex surface region shaped to mate with the complex surface of the first component to locate the fixture relative to the first component,
wherein the fixture includes a second locator configured to mate with the second complex surface to locate the fixture relative to the second component;
wherein the first component and the second component are constrained relative to each other in six degrees of freedom by the first complex surface mating with the first locator and the second complex surface mating with the second locator with the second component located relative to the first component in position for assembly.

2. The locating fixture system of claim 1, wherein the fixture comprises an additive manufactured built-up material with compliance tailored printed features that provide relatively lower compliance in at least one direction to target critical locating dimensions and relatively higher compliance in at least one other direction.

3. The locating fixture system of claim 1, wherein the fixture is configured for portability by comprising a polymeric material and by being configured specifically for locating the first component and the second component relative to one another.

4. The locating fixture system of claim 1, wherein the complex surface comprises at least one complex algebraic surface.

5. The locating fixture system of claim 1, comprising a pin extending through the fixture and into the first component at the complex surface.

6. The locating fixture system of claim 1, wherein the first locator comprises an elastically deformable structure and is configured to provide an elastic averaging effect in locating the fixture relative to the first component.

7. The locating fixture system of claim 1, wherein the fixture comprises:
a third locator; and
an adjustment mechanism on the fixture and engaging the third locator to adjust a position of the third locator.

8. The locating fixture system of claim 1, wherein:
the second component comprises a plural number of components each of the plural number of components shaped to be connected with the first component,
the first component comprises independent localized datum features specific to each one of the plural number of components,
the fixture comprises a plural number of fixtures each one of the plural number of fixtures configured to position a corresponding one of the plural number of components as it is added to the assembly.

9. The locating fixture system of claim 1, wherein the fixture comprises an integrated sensor configured to monitor at least one parameter of the locating fixture system.

10. The locating fixture system of claim 9, wherein the fixture comprises a magnet configured to hold the fixture to at least one of the first component and the second component, and wherein the parameter comprises an electromotive force generated by the magnet.

11. A locating method comprising:
forming a first component with a first complex surface, where the first complex surface is smoothly contoured;
forming a second component with a second complex surface, the second component shaped for connection with the first component;
forming a fixture including a first locator comprising a complex surface region shaped to mate with the first complex surface of the first component;
forming the fixture to include a second locator configured to mate with the second complex surface to locate the fixture relative to the second component;
locating, by the fixture, the first component relative to the second component using the first complex surface of the first component and the second complex surface of the second component;
connecting the first component with the second component; and
constraining the first component and the second component relative to each other in six degrees of freedom by the first complex surface mating with the first locator and the second complex surface mating with the second locator with the second component located relative to the first component in position for assembly.

12. The locating method of claim 11, comprising:
forming the fixture by additive manufacturing of multiple built-up materials where different the multiple built-up materials exhibit different stiffnesses to controls compliance in different directions.

13. The locating method of claim 11, comprising:
forming the fixture of a polymeric material;
tailoring the fixture specifically to locate the first component relative to the second component; and
tailoring the fixture for portability for use in field service and repairs.

14. The locating method of claim 11, comprising forming the first complex surface as at least one complex algebraic surface.

15. The locating method of claim 11, comprising extending a pin through the fixture and into the first component at the first complex surface to constrain the first component.

16. The locating method of claim 11, comprising:
forming the first locator as an elastically deformable structure; and
providing, by the first locator, an elastic averaging effect in locating the fixture relative to the first component.

17. The locating method of claim 11, comprising:
adding a third locator to the fixture;

extending a screw through the fixture;
engaging the third locator with the screw; and
adjusting, by the screw, a position of the third locator.

18. The locating method of claim 11, comprising:
integrating a magnet into the fixture; and
holding, by the magnet, the fixture to at least one of the first component and the second component.

19. The locating method of claim 11, comprising:
integrating a sensor into the fixture;
monitoring, by the sensor, at least one parameter related to the fixture.

20. A locating fixture system comprising:
a first component having a first complex surface, where the first complex surface is smoothly contoured;
a second component having a second complex surface, the second component shaped to be connected with the first component; and
a fixture comprising an additive manufactured built-up material, the fixture configured to locate the first component relative to the second component using the first complex surface of the first component and the second complex surface of the second component,
wherein the fixture includes a first locator comprising a complex surface region shaped to mate with the first complex surface of the first component to locate the fixture relative to the first component,
wherein the first locator comprises an elastically deformable structure and is configured to provide an elastic averaging effect in locating the fixture relative to the first component,
wherein the fixture includes a second locator configured to mate with the second complex surface to locate the fixture relative to the second component,
wherein the first component and the second component are constrained relative to each other in six degrees of freedom by the first complex surface mating with the first locator and the second complex surface mating with the second locator with the second component located relative to the first component in position for assembly.

\* \* \* \* \*